US010642712B2

(12) United States Patent
Luo et al.

(10) Patent No.: US 10,642,712 B2
(45) Date of Patent: May 5, 2020

(54) LOG PROCESSING AND ANALYSIS

(71) Applicants: Yu Luo, Toronto (CA); Kirk Rodrigues, Toronto (CA); Michael Stumm, Toronto (CA); Ding Yuan, Toronto (CA); Xu Zhao, Toronto (CA)

(72) Inventors: Yu Luo, Toronto (CA); Kirk Rodrigues, Toronto (CA); Michael Stumm, Toronto (CA); Ding Yuan, Toronto (CA); Xu Zhao, Toronto (CA)

(73) Assignee: YSCOPE INC., Toronto (CA)

( * ) Notice: Subject to any disclaimer, the term of this patent is extended or adjusted under 35 U.S.C. 154(b) by 0 days.

(21) Appl. No.: 15/790,918

(22) Filed: Oct. 23, 2017

(65) Prior Publication Data

US 2018/0113783 A1    Apr. 26, 2018

Related U.S. Application Data

(60) Provisional application No. 62/411,725, filed on Oct. 24, 2016.

(51) Int. Cl.
| | |
|---|---|
| *G06F 11/34* | (2006.01) |
| *G06F 11/36* | (2006.01) |
| *G06F 11/32* | (2006.01) |
| *G06F 16/901* | (2019.01) |

(52) U.S. Cl.
CPC ........ *G06F 11/3476* (2013.01); *G06F 11/323* (2013.01); *G06F 11/3419* (2013.01); *G06F 11/3604* (2013.01); *G06F 11/3612* (2013.01); *G06F 11/3636* (2013.01); *G06F 16/9024* (2019.01); *G06F 2201/865* (2013.01)

(58) Field of Classification Search
None
See application file for complete search history.

(56) References Cited

U.S. PATENT DOCUMENTS

| 6,470,388 | B1* | 10/2002 | Niemi | G06F 11/3476 |
| | | | | 709/223 |
| 6,978,444 | B1* | 12/2005 | Farchi | G06F 11/3636 |
| | | | | 714/38.13 |
| 2005/0044536 | A1* | 2/2005 | Kwong | G06F 11/3636 |
| | | | | 717/128 |
| 2006/0293940 | A1* | 12/2006 | Tsyganskiy | G06F 8/72 |
| | | | | 705/7.29 |
| 2011/0213883 | A1* | 9/2011 | Athey | G06Q 10/06 |
| | | | | 709/226 |
| 2016/0098342 | A1* | 4/2016 | Faizanullah | H04L 67/34 |
| | | | | 717/131 |

(Continued)

OTHER PUBLICATIONS

Zhao, Xu, et al. "lprof: A non-intrusive request flow profiler for distributed systems." 11th {USENIX} Symposium on Operating Systems Design and Implementation ({OSDI} 14). 2014.

(Continued)

*Primary Examiner* — Daxin Wu
(74) *Attorney, Agent, or Firm* — Perry + Currier Inc.

(57) ABSTRACT

A log of execution of an executable program is obtained. Log messages contained in the log are parsed to generate object identifiers representative of instances of programmatic elements in the executable program. Relationships among the object identifiers are identified. A representation of identified relationships is constructed and outputted as, for example, a visual representation.

16 Claims, 9 Drawing Sheets

(56) References Cited

U.S. PATENT DOCUMENTS

2016/0124793 A1* 5/2016 Ruan .................. G06F 11/2257
714/37

OTHER PUBLICATIONS

Yuan et al., "Simple Testing Can Prevent Most Critical Failures: An Analysis of Production Failures in Distributed Data-intensive Systems"USENIX; login: 40(1), Feb. 2015.

Lion, David, et al. "Don't get caught in the cold, warm-up your {JVM}: Understand and eliminate {JVM} warm-up overhead in data-parallel systems." 12th {USENIX} Symposium on Operating Systems Design and Implementation ({OSDI} 16). 2016.

Zhao, Xu, et al. "Non-intrusive performance profiling for entire software stacks based on the flow reconstruction principle." 12th {USENIX} Symposium on Operating Systems Design and Implementation ({OSDI} 16). 2016.

Zhang, Yongle, et al. "Pensieve: Non-intrusive failure reproduction for distributed systems using the event chaining approach.". Proceedings of the 26th Symposium on Operating Systems Principles. 2017.

Zhao, Xu, et al. "Log20: Fully automated optimal placement of log printing statements under specified overhead threshold.". Proceedings of the 26th Symposium on Operating Systems Principles. 2017.

Tan, Lin, Ding Yuan, and Yuanyuan Zhou. "Hotcomments: how to make program comments more useful?." Proceedings of the 11th USENIX workshop on Hot topics in operating systems. USENIX Association, 2007.

Tan, Lin, et al. "/* iComment: Bugs or bad comments?". Proceedings of twenty-first ACM SIGOPS symposium on Operating systems principles: 2007.

Yuan, Ding, et al. "CISpan: comprehensive incremental mining algorithms of closed sequential patterns for multi-versional software mining." Proceedings of the 2008 SIAM International Conference on Data Mining. Society for Industrial and Applied Mathematics. 2008.

Yuan, Ding, et al. "SherLog: error diagnosis by connecting clues from run-time logs." Proceedings of the fifteenth International Conference on Architehtural support for programming languages and operating systems. 2010.

Yuan, Ding, et al. "Context-based online configuration-error detection." Proceedings of the 2011 USENIX conference on USENIX annual technical conference. USENIX Association. 2011.

Yin, Zuoning, et al. "How do fixes become bugs?." Proceedings of the 19th ACM SIGSOFT symposium and the 13th European conference on Foundations of software engineering. 2011.

Yuan, Ding, Soyeon Park, and Yuanyuan Zhou. "Characterizing logging practices in open-source software." 2012 34th International Conference on Software Engineering (ICSE). IEEE, 2012.

Yuan, Ding, et al. "Be conservative: enhancing failure diagnosis with proactive logging." Presented as part of the 10th (USENIX) Symposium on Operating Systems Design and Implementation ({OSDI} 12). 2012.

Xu, Tianyin, et al. "Do not blame users for misconfigurations." Proceedings of the Twenty-Fourth ACM Symposium on Operating Systems Principles. 2013.

Zhao, Xu, et al. "The game of twenty questions: Do you know where to log?." Proceedings of the 16th Workshop on Hot Topics in Operating Systems. 2017.

Oracle. "Package Java.util.logging." Java.util.logging (Java Platform SE 8), 1993, URL: https://docs.oracle.com/javase/8/docs/api/java/util/logging/package-summary.html Elastic. "Kibana: Your window into the Elastic Stack." Elastic, 2020, URL: https://www.elastic.co/products/kibana.

Sourceforge. "Log for C++ Project." Log for C++ Project, Apr. 18, 2017, URL: http://log4cpp.sourceforge.net/.

Logging Apache. "Apache Log4j 2." Log4j-Apache Log4j 2, Dec. 11, 2019, URL: http://logging.apache.org/log4j/2.x/.

Nagios. "The Industry Standard in IT Infrastructure Monitoring." Nagios, Jun. 2, 2007, URL: http://www.nagios.org/.

Python. "15.7. Logging—Logging Facility for Python." 15.7. Logging—Logging Facility for Python—Python 2.7.17 Documentation, Jan. 7, 2020, URL: https://docs.python.org/2/library/logging.html.

Rsyslog. "The Rocket-Fast Syslog Server." Rsyslog, 2008, URL: www.rsyslog.com/.

SLF4J. "Simple Logging Facade for Java (SLF4J)." SLF4J, Mar. 15, 2016, URL: http://www.slf4j.org/.

Gerhards, Rainer. "The Syslog Protocol." IETF Tools, IETF, Mar. 2009, URL: http://tools.ietf.org/html/rfc5424.

Yuan, Ding, et al. "Simple testing can prevent most critical failures: An analysis of production failures in distributed data-intensive systems." 11th {USENIX} Symposium on Operating Systems Design and Implementation ({OSDI} 14). 2014.

Yuan, Ding, et al. "Improving software diagnosability via log enhancement." ACM Transactions on Computer Systems (TOCS) 30.1 (2012): 1-28.

Lion et al., "Don't Get Caught in the Cold, Warm-up Your JVM: Understand and Eliminate JVM Warm-up Overhead in Data-parallel Systems", USENIX;login: 42(1), Spring 2017.

Yuan et al. "Improving Software Diagnosability via Log Enhancement", In the Proceedings of the 16th International Conference on Architecture Support for Programming Language and Operating Systems (ASPLOS'11), pp. 3-14, Newport Beach, CA., Mar. 2011.

Splunk. "Log Management: Log Analysis Monitoring Software." Splunk, 2005, URL: http://www.splunk.com/view/log-management/SP-CAAAC6F.

Vmware, "Highly Intelligent Log Management and Analytics Tool." VMware, Feb. 4, 2020, URL https://www.vmware.com/ca/products/vrealize-log-insight.html.

Vmware. "VCenter Server: Centralized Visibility, Proactive Management and Extensibility for VMware VSphere from a Single Console. "VMware, Dec. 13, 2019, URL: www.vmware.com/ca/products/vcenter-server.html.

Elastic "Logstash: Centralize, transform & stash your data", Elastic, 2020, URL: https://www.elastic.co/logstash.

New Relic, "Deliver More Perfect Software." , New Relic, Sep. 19, 2019, URL: https://newrelic.com/.

Sourceforge "About OProfile", Jul. 16, 2018, URL: https://oprofile.sourceforge.io/about/.

Sourceforge, "Example Reports." OProfile Examples, Jul. 16, 2018, URL: https://oprofile.sourceforge.io/examples/.

Sourceforge, OProfile FAQ, Jul. 16, 2018, URL: https://oprofile.sourceforge/io/faq/.

* cited by examiner $$match(a,b) = \begin{cases} b - a + 1 & \text{if } L[a..b] \text{ matches a constant} \\ 0 & \text{otherwise} \end{cases}$$

FIG. 4A $$M(i) = \max \{match(0,i), \max_{0 \leq j < i} \{M(j) + match(j+1, i)\}\}$$

FIG. 4B

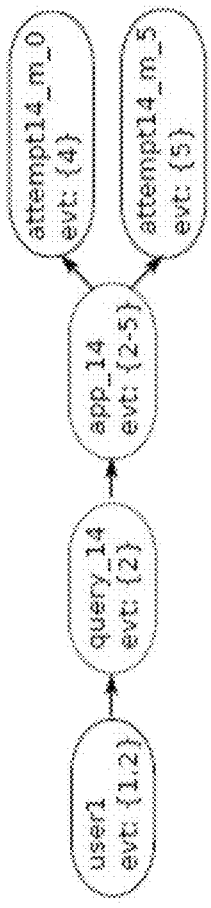
FIG. 7
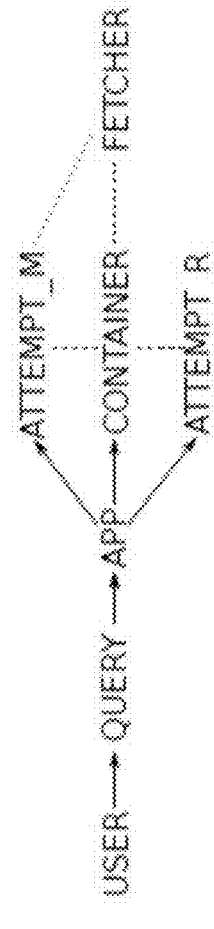
FIG. 8
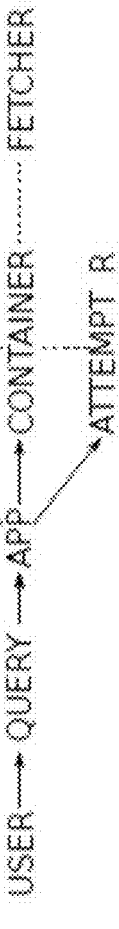
FIG. 10
FIG. 9

```
Input  : G: Type Relation Graph, EVENTS
Output: System Stack Structure (S³) Graph
/* Step 1:  merge ≡ nodes in G          */
1  foreach connected component C of ≡ relations do
2  |   foreach subset S: {T₁,..Tₙ} in decreasing size do
3  |   |   if ∀i ∈ [1,n], ∀obj_i ∈ T_i,
   |   |       ∃obj_j ∈ T₁,..obj_k ∈ Tₙ s.t.
   |   |       obj_i ≡ ..obj_j ≡ ..obj_k then
4  |   |   |   Node N ← merge(T₁,T₂,...,Tₙ);
5  |   |   |   N.sig ← hash(T₁.sig, T₂.sig, .. Tₙ.sig);
6  |   |   |   replace T_i.sig with N.sig in EVENTS;
7  |   |   end
8  |   end
9  end
10 remove any outstanding ≡ edges;
/* Step 2:  process ⋈ relations          */
11 foreach connected component C of ⋈ relations do
12 |   S ← {all the types in C};
13 |   foreach E ∈ EVENTS do
14 |   |   sig ← E ∩ S;
15 |   |   if ∃ Node n where n.sig = sig then
16 |   |   |   nv ← new Node() with nv.sig ← sig;
17 |   |   |   if ∃ Node n' where n'.sig ⊂ nv.sig then
18 |   |   |   |   add edge n' → nv;
19 |   |   |   end
20 |   |   else
21 |   |   |   mark n;
22 |   |   end
23 |   end
24 |   remove all unmarked nodes from C;
25 end
/* Step 3:  filter non-object-types */
26 foreach Node n do
27 |   if ∃ Node n1,n2 s.t. n1.sig ∩ n2.sig = ∅ and
   |       n1.sig ∪ n2.sig ⊆ n.sig then
28 |   |   remove n;
29 |   end
30 end
```

FIG. 11

| | Log events | | Identifiers | | Objects | | | Edges | | |
|---|---|---|---|---|---|---|---|---|---|---|
| | Instances | Types | Instances | Types | Instances | Types | Accuracy | Instances | Types | Accuracy |
| Hive | 3,081,149 | 206 | 915,872 | 69 | 295,042 | 32 | 98% | 401,924 | 73 | 87% |
| Spark | 8,203,395 | 151 | 3,627,885 | 56 | 192,969 | 31 | 94% | 485,133 | 60 | 93% |
| OpenStack | 2,336,227 | 20 | 766,203 | 13 | 214,882 | 14 | 100% | 2,196,315 | 19 | 100% |
| Production | 312,779 | 36 | 123,668 | 22 | 8,141 | 24 | 100% | 16,056 | 41 | 88% |
| Total | 14,833,580 | 413 | 5,433,628 | 160 | 711,034 | 101 | 96% | 3,099,428 | 193 | 95% |

FIG. 14

LOG PROCESSING AND ANALYSIS

CROSS-REFERENCE TO RELATED APPLICATIONS

This application claims the benefit of U.S. Provisional Application Ser. No. 62/411,725, filed Oct. 24, 2016, which is incorporated herein by reference.

FIELD

This disclosure relates to computers and computer networks.

BACKGROUND

Internet services today, such as those provided by Google™, Facebook™, Amazon™, and the like, tend to be built upon distributed server stacks. Understanding the performance behavior of distributed server stacks at scale is a non-trivial problem. For instance, the servicing of just a single request can trigger numerous sub-requests across heterogeneous software components. Further, it is often the case that many similar requests are serviced concurrently and in parallel. When a user experiences poor performance, it is extremely difficult to identify the root cause, as well as the software components and machines that are the culprits.

For example, a simple Hive query may involve a YARN (Yet Another Resource Negotiator) "ResourceManager," numerous YARN "ApplicationManager" and "NodeManager" components, several "MapReduce" tasks, and multiple Hadoop Distributed File System (HDFS) servers.

Numerous tools have been developed to help identify performance anomalies and their root causes in these types of distributed systems. The tools have employed a variety of methods, which tend to have significant limitations. Many methods require the target systems to be instrumented with dedicated code to collect information. As such, they are intrusive and often cannot be applied to legacy or third-party components. Other methods are non-intrusive and instead analyze already existing system logs, using either use machine learning approaches to identify anomalies or relying on static code analysis. Approaches that use machine learning techniques cannot understand the underlying system behavior and thus may not help identify the root cause of an anomaly. Approaches that require static code analysis are limited to components where such static analysis is possible, and they tend to be unable to understand the interactions between different software components.

BRIEF DESCRIPTION OF THE DRAWINGS

FIG. 4A is a definition of an example matching function.

FIG. 4B is a definition of an example string matching computation.

FIG. 7 is a diagram of an example graph.

FIG. 8 is a diagram of an example instantiated graph.

FIG. 9 is a listing of example log messages.

FIG. 10 is a diagram of an example type relation graph of relationships between object types.

FIG. 11 is a listing of pseudocode of an example object identification process.

FIG. 14 is a table of test results.

DETAILED DESCRIPTION

Figure 1:
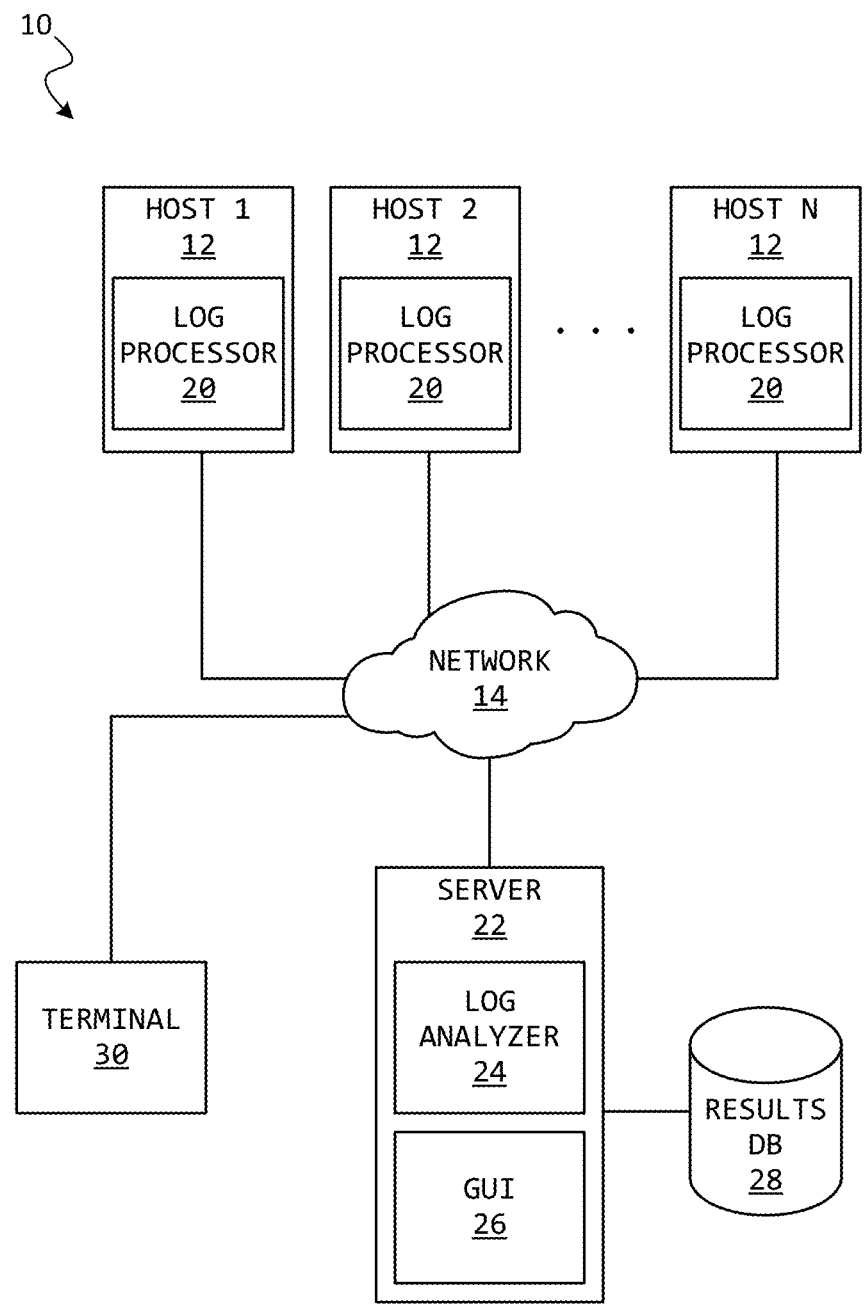
FIG. 1 is a block diagram of an example performance analysis system.

The techniques described herein allow for profiling the performance of an entire distributed software stack solely using the unstructured log data generated by heterogeneous software components. A system model of the entire software stack may be constructed without needing prior knowledge of the stack. The techniques described herein may automatically reconstruct the extensive domain knowledge of the programmers who wrote the code for the stack. A Flow Reconstruction Principle, which states that programmers log events such that one can reliably reconstruct the execution flow a posteriori, may be used. Improvements to performance profiling, resource optimization, and failure diagnosis of systems software may be realized.

A tool may be provided to extract information from standard logs and to visually display individual objects over their lifetimes to show, for example, how and when objects interact with each other. The tool may initially display high-level object instances (e.g., a Hive query) that can then be drilled down to view lower level instances (e.g., HDFS blocks, MapReduce tasks, or containers), referencing gathered information on object relationships. A hierarchical approach to displaying information allows for understanding what can often be an overwhelming number captured log events and a high number of objects involved.

The techniques discussed herein use the Flow Reconstruction Principle, which posits that programmers will tend to produce code that outputs sufficient information to logs, so that runtime execution flows may be reconstructed after the fact. More specifically, programmers will tend to insert, for each important event, a log printing/output statement that outputs the identifiers of relevant objects involved with the event. This allows at least partial reconstruction of execution flows a posteriori.

It should be noted that, in this description, the term "identifier" refers to a variable value that may be used to differentiate objects. Examples of identifiers include a thread identifier (ID), a process ID, a file name, and a host name. Examples of non-identifiers include a value of a counter or central processing unit (CPU) usage statistics. Note that a counter itself may be an object, but its value is not considered an identifier because it is not normally intended to be used to differentiate different counter instances.

Inserting log statements into programmatic code is a widely followed practice. Many object identifiers, such as process ID and thread ID, are automatically outputted by underlying logging libraries for each event. Programmers tend to insert log statements to allow them to reconstruct how a failure occurred. Specifically, programmers may tend to log a sufficient number of events, even at default logging verbosity, at critical points in the control path, so as to enable a post mortem understanding of the control flow leading up to a failure.

Programmers may tend to identify the objects involved in the event to help differentiate between log statements of concurrent/parallel homogeneous control flows. Note that this would not generally be possible when solely using constant strings. For example, if two concurrent processes, when opening a file, both output a string such as "opening file" without additional identifiers (e.g., process identifier) then one would not be able to attribute this type of event to either process.

Programmers may tend to include a sufficient number of object identifiers in the same log statement to unambiguously identify the objects involved. Note that many identifiers are naturally ambiguous and need to be put into context in order to uniquely identify an object. For example, a thread identifier (e.g., tid) needs to be interpreted in the context of a specific process, and a process identifier (e.g., pid) needs to be interpreted in the context of a specific host. Hence, a programmer will not typically output a tid alone, but will tend to also include a pid and a hostname. If the identifiers are printed separately in multiple, thread-safe log statements (e.g., hostname and pid in one log statement and tid in a subsequent one) then a programmer may no longer be able to reliably determine the context of each tid because a multi-threaded system can interleave multiple instances of these log entries.

The techniques discussed herein may disregard constant strings and may not attempt to extract semantics from object identifiers. Interpretation of constant strings and identifiers that contain string sequences, which may be meaningful to the programmer, is avoided. Instead, information about objects is extracted by analyzing various patterns that exist in the logs.

FIG. 1 shows an example performance analysis system 10. The system 10 includes a plurality of hosts 12 mutually connected by a computer network 14. A host 12 may be a server or other component of a distributed service whose performance is to be analyzed. A host 12 may be referred to as a "node" or "network node" and use of the term "host" is not intended to be limiting, but rather to distinguish the hosts 12 from graph nodes discussed below.

The network 14 may include any local-area network (LAN), wide-area network (WAN), wireless network, intranet, internet, similar type of network, or a combination of such.

The system 10 further includes a log processor 20 installed at each of the hosts 12, a server 22 connected to the network 14, a log analyzer 24 at the server 22, a graphical user interface (GUI) 26, and a results database 28 at or connected to the server 22.

Each of the hosts 12 and the server 22 may include a processor and memory that cooperate to execute instructions. Examples of processors include a CPU, a microcontroller, a microprocessor, a processing core, a field-programmable gate array (FPGA), or similar device capable of executing instructions. Memory may include a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

Each log processor 20 includes instructions to obtain and parse logs generated by the host 12 at which the log processor 20 is installed. Such logs may contain log messages that are generated by log statements written by human programmers and provided to an executable program operational at the host 12. This kind of log statement is often inserted by programmers to assist in debugging, and it is not necessary that such log statements conform to any standard or provide any specific information or hook. Additionally or alternatively, logs may contain log messages that are generated by an automated tool or program, such as a tracing tool. This kind of log statement is often inserted automatically, for example under the direction of a human programmer, and may have a predictable format or hook, but not necessarily.

A log processor 20 may be configured to locate active logs, parse log messages into a set of object identifiers and related data, and communicate such data to the server 22. A log processor 20 may be referred to a client or client program.

The log analyzer 24 at the server 22 includes instructions to analyze the log data provided by the log processors 20. For example, the log analyzer 24 may analyze events received from all log processors 20 to build a visual representation, such as a System Stack Structure ($S^3$ or S3) graph, or similar graph, and instantiate the S3 graph with object instances. Other examples of visual representations include data tables, charts, text, and the like. In further examples, other types of representations, such as data files, may be generated and outputted for consumption by a user or by a program or tool.

A log processor 20 and the log analyzer 24 may communicate using any suitable scheme. For example, the log processor 20 may initiate transmission of newly obtained data to the log analyzer 24 and such transmission may be unidirectional. This may not require any adjustments to a firewall that protects the hosts 12. In another example, the log analyzer 24 may poll the log processor 20 for any new data.

The log processor 20 may be located at the server 22 with the log analyzer 24. In such case, raw logs may be transmitted from the hosts 12 to the server 22 for processing by the log processor 20 and log analyzer 24. Conversely, the log analyzer 24 may be located at the host 12 with the log processor 20 for processing and analyzing the logs at the host 12. The GUI 26 may be provided to the host 12 as well. In either case, the log processor 20 and the log analyzer 24 may be included in the same program or may be separate programs.

The GUI 26 includes instructions to generate output and receive input for interaction with the log analyzer 24. The GUI 26 may include a web interface, application, or other component that is provided to a remote terminal 30 via the network 14. A user at the remote terminal 30 may thus interact with the log analyzer 24, with data being communicated between the terminal 30 and the server 22 via the network 14.

The results database 28 may store data received from the log processors 20 and data generated by the log analyzer 24.

The server 22 may further include a login component, an authentication component, an authorization component, an encryption component, similar components, or a combination of such. The functionality of the log analyzer 24 may be provided to various users or groups of users having various access permissions. For example, several different organizations operating different groups of hosts 12 to implement different services may independently install log processors 20 on their hosts 12 and operate the log analyzer 24 independent of each other via, for example, respective terminals 30. Further, a log processor 20 may include an encryption component, such that data communicated between the log processor 20 and the server 22 may be secured.

Figure 2:
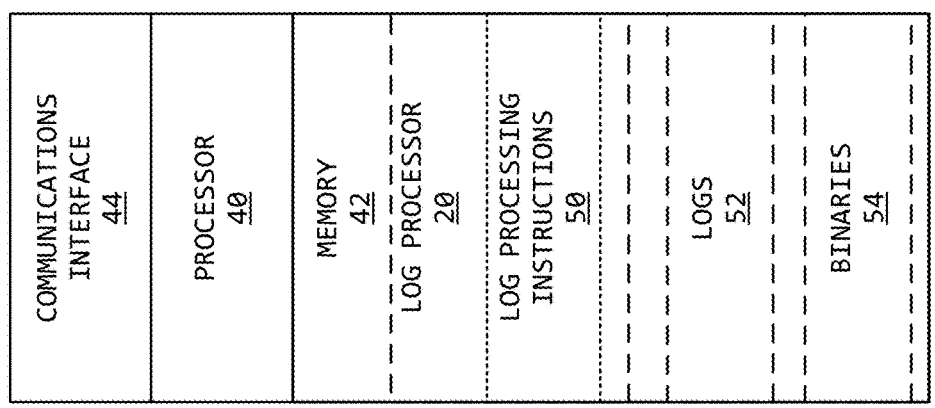
FIG. 2 is a block diagram of the log processor of FIG. 1.

FIG. 2 show an example log processor 20.

The log processor 20 is executable at a host 12 that includes a processor 40, memory 42, and communications interface 44. The processor 40 and memory 42 have been described elsewhere. The communications interface 44 may include an Ethernet interface, a wireless interface, or similar device capable of communicating data between the log processor 20 and a computer network 14.

The log processor 20 may include log processing instructions 50 to discover log files 52 and related binary executable programs 54 present at the host 12, extract and parse data from the logs 52 and binaries 54, and send such data to the server 22.

The log processing instructions 50 may be to discover a log of execution of an executable program 54, locate the executable program 54 in the file system of the host 12, parse log messages contained in the log to generate object identifiers representative of instances of programmatic elements in the executable program, and identify relationships among the object identifiers to obtain identified relationships for output in a visual representation, such as an S3 or S3i graph. Programmatic elements include such things as variables, classes, fields, functions, subroutines, and the like. Indications of the identified relationships and other log data may be transmitted to the server 22 via a network 14 for analysis at the log analyzer 24.

The log processing instructions 50 may further be to extract a string constant from the executable program 54 and to use the string constant to parse the log messages to generate the object identifiers.

The log processing instructions 50 may further be to infer types of objects represented by the object identifiers, and to identify relationships among the types when obtaining the identified relationships. Object type is an empirically determined type, which is not necessarily constrained to correspond to a type defined by a programming language of the executable program 54. That is, the log processing instructions 50 infers type without access to the underlying source code and some of these interferences may be the same as in the source code and some may be different.

Figure 3:
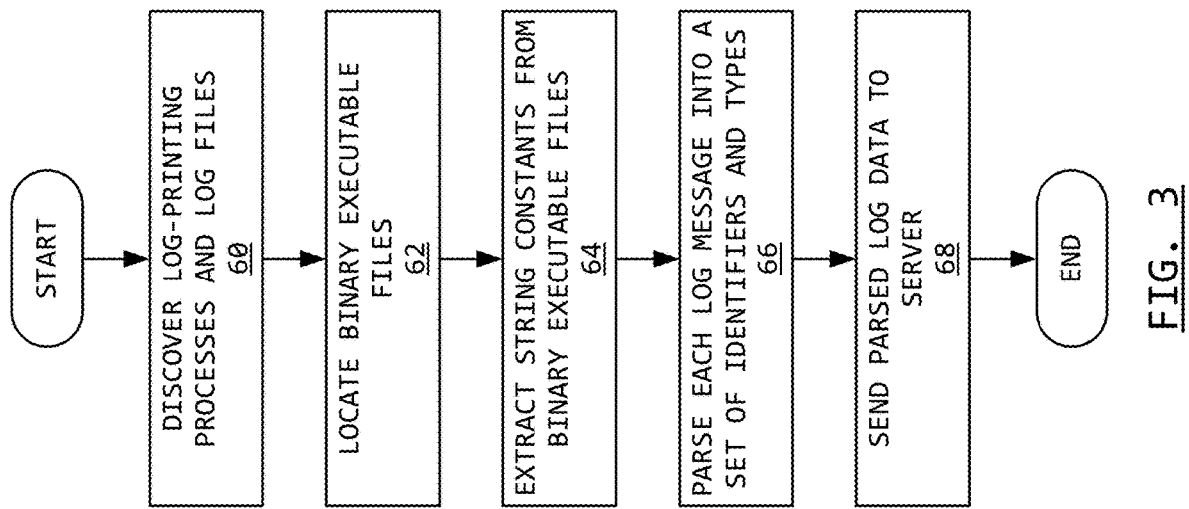
FIG. 3 is a flowchart of an example process to obtain and parse log data.

FIG. 3 shows a process for obtaining and parsing log data. The process may be performed by the log processing instructions 50 at each log processor installed at a plurality of hosts 12.

At block 60, the process automatically discovers processes (e.g., programs in execution) that output log messages to files.

For example, a daemon process may be executed to wake the log processor at a predetermined interval or epoch. During each epoch the host is scanned to find all running processes. This may be accomplished by scanning a the /proc file system on Linux™. Each process's file descriptors are examined to locate log files. A log may be identified if its file type (e.g., as determined by the file's magic number) is ASCII text and its name or a parent directory's name contains the text "log". Other examples of identifying log files are also possible.

The length of an epoch may be a trade-off between the timeliness of monitoring and the amount of network traffic. An epoch length of zero will force the log processor to stay awake and send parsed log messages one at a time. A long epoch will compress log messages that have the same set of identifiers within the epoch into a single tuple. Since log messages often arrive in a bursty manner, even a small epoch can significantly reduce network traffic. An example epoch length is one second.

At block 62, binary executable files/programs of the discovered processes are located.

For each process with an open log file, executables of the process (including dynamically linked libraries) may be located by searching through the process's file descriptors and memory mapped files. For Java Virtual Machine™ (JVM) processes, a process's classpath may be searched for .jar, .war, and .class files. This ensures that executables are found even if they were already closed by the JVM. Similarly, for Python™ processes, the starting script may be identified from the shell command (e.g., ./script.py) and then Python's ModuleFinder package may be used to locate the remaining scripts in the dependency graph, regardless of whether they are currently open.

At block 64, string constants are extracted from the binary executable programs.

All constant strings may be extracted from each executable. For Executable and Linkable Format (ELF) executables, constants may be extracted from the read-only data segments (i.e., .rodata and .rodata1) by treating "\0" as a string terminator. For Java class files strings may be extracted from each file's constant pool. For Python bytecode, strings may be extracted from the co_consts field in the Python code object. Other examples of constant extraction are also contemplated.

At block 66, the discovered log messages are parsed and object identifiers and their types are extracted. Object identifiers may be representative of instances of programmatic elements in the executable program.

Log parsing is to extract the identifier values and infer their types from each log message. If an executable's constant string contains format specifiers, then this string can be directly used as a regular expression, where the specifiers are metacharacters (e.g., "% d" can be converted to "(\d+)" to extract an integer). The pattern matched by a format specifier may be treated as a variable value.

Many variable values outputted to log messages from Java, Scala™, C++, and Python programs use string concatenation operators. For example, the message "2016-04-02T00:58:48.734 MongoDB starting:pid=22925 port=27017 dbpath=/var/lib/mongodb" may be printed by the following code snippet:

I<<"MongoDB starting:pid="<<pid
<<"port="<<serverGlobalParams.port
<<"dbpath="<<storageGlobalParams.dbpath;

As such, an approach generic to all of the aforementioned languages may be used. For each log message, any segment that matches a constant string may be treated as static text, leaving only the variable values. In the example above, "MongoDB starting: pid=", "port=", "dbpath=" are three of the constant strings parsed from MongoDB™ executable, leaving "22925", "27017", and "/var/lib/mongodb" as variable values.

String matching may be achieved using a dynamic programming algorithm. Given a log string of length n, L[0 . . . n−1], where M(i) is the maximum number of characters in L[0 . . . i] that are matched by constant strings, a subset of constant strings that matches M(n−1) characters of L in a non-overlapping manner may be found using a function match( ) shown in FIG. 4A. M(i) may then be iteratively computed as shown in FIG. 4B.

String matching may only be necessary the first time a log message type is parsed. After parsing a message, a regular expression may be build. Continuing the above example, a regular expression may be as follows:

"MongoDB starting: pid=(\d+) port=(\d+) dbpath=(.*)".

When another message is printed by the same statement, it can be directly matched against the regular expression. A heuristic may be used to discard any string literals with fewer than three characters since, as executables tend to contain most permutations of one and two character strings. Using such strings could miscategorize identifier values as static text.

The type of each variable may be inferred as follows. First, a variable is expanded to include characters within the word boundary delimited by whitespace. If the expansion includes static strings, then this "schema" of constant strings serves as the variable's type. For example, consider this Hadoop log message: "app_14 created task attempt14_r_0". Initially, the occurrences of "14" and "0" are recognized as variables, while "app_", "created task", "attempt", and "_r_" are constant strings. Following expansion, the types of these two variables are "app_(\d+)" and "attempt(\d+)_r_(\d+)".

If a variable still does not include constant strings after the expansion, the process may trace backwards starting from the variable and use the first matched static text alphabetical word as the type. For example, in the MongoDB example, the three variables would have the types "pid", "port", and "dbpath" respectively.

Heuristics may be used to avoid capturing non-identifier variables. A first heuristic may eliminate variables with types that do not end with a noun since identifiers tend to have noun-based types. For example, in the log, "Slow BlockReceiver write packet to mirror took 20 ms", the latency variable is eliminated since the preceding static text, "took", is a verb. Another heuristic may eliminate variables whose types are common non-identifiers (e.g., "size", "usage", "progress", etc.).

Regular expressions generated by or used in the process may be modifiable by the user.

At block 68, the parsed log messages are sent to the log analyzer 24 at the server 22.

For example, at the end of each epoch, parsed log messages from the most recent epoch may be sent to the log analyzer 24 at the server 22. A suitable network protocol may include the following fields: (1) the timestamp of the epoch; and (2) a list of tuples, each with the format such as:

<severity, log file, {ID1:type1, ID2:type2, . . . }, count>

All log messages from the same log file with the same set of identifiers and severity (e.g., INFO, WARN, etc.) are aggregated into a single tuple with the "count" field indicating the number of such log messages. This protocol message is then sent. A utility such as Rsyslog™ may be used, particularly if communication is to be unidirectional.

Figure 5:
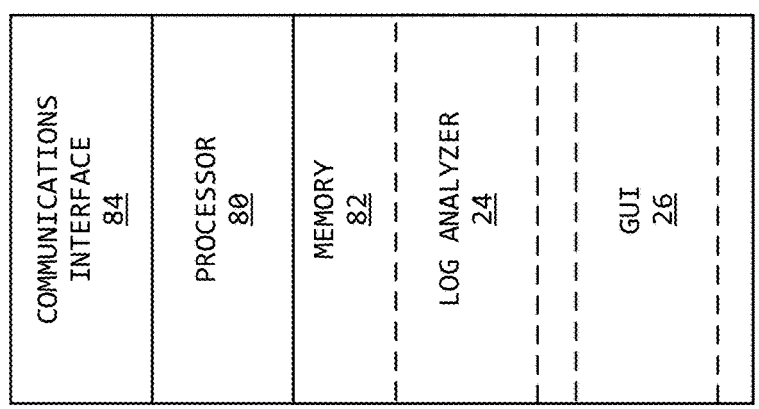
FIG. 5 is a block diagram of the server component of FIG. 1.

FIG. 5 show an example server 22.

A log analyzer 24 is executable at the server 22, which includes a processor 80, memory 82, and communications interface 84. The processor 80 and memory 82 have been described elsewhere. The communications interface 84 may include an Ethernet interface, a wireless interface, or similar device capable of communicating data between the log analyzer 24 and a computer network 14.

The log analyzer 24 may include instructions to analyze log data provided by log processors 20, such as by performing an analysis on data received from log processors 20 installed at related hosts 12. The instructions may be to obtain log data that includes identified relationships among object identifiers representative of instances of programmatic elements in an executable program at a host 12, construct a visual representation of the identified relationships, and output the visual representation for display. The log analyzer 24 may include instructions to construct an S3 graph, or similar visualization, and instantiate the S3 graph with object instances. Such a graph may have nodes defined by object identifiers. Events associated with the object identifiers may be determined and included in the visual representation. This may take the form of an event timeline.

The log analyzer 24 and the GUI 26 may include instructions to store and retrieve data from the results database 28.

The GUI 26 may include instructions that may be executed by the server 22, each terminal 30, or cooperatively by the server 22 and each terminal 30. In one example, the GUI 26 is transmitted from the server 22 to a terminal 30 for execution at the terminal 30. In another example, the GUI 26 is executed by the server 22 and input/output of the GUI is communicated between the server 22 and each terminal 30.

Figure 6:
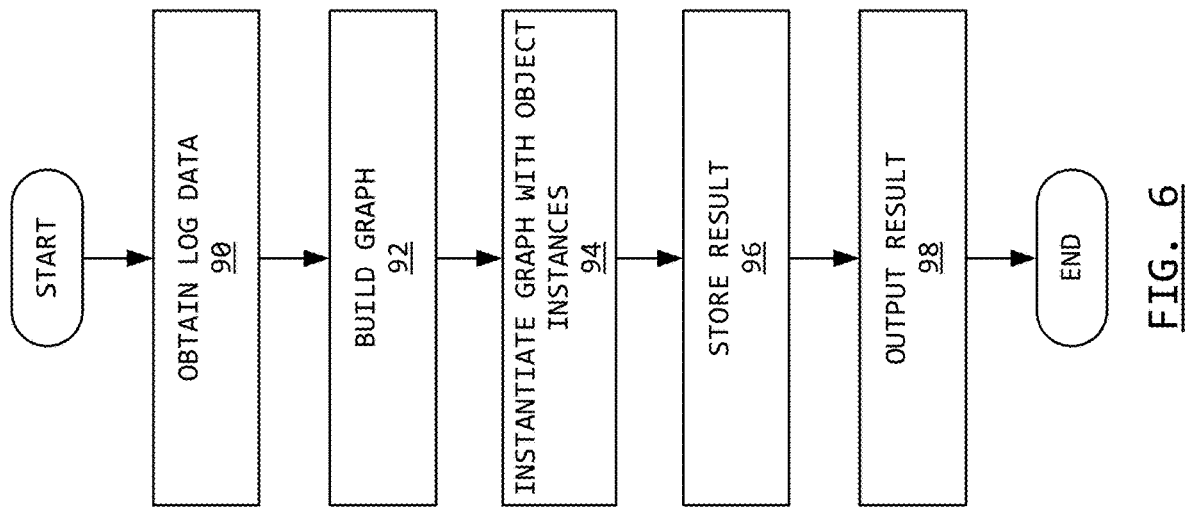
FIG. 6 is a flowchart of an example process to generate and output a log analysis.

FIG. 6 shows a process for generating an outputting log analyses based on log data. The process may be performed by the log analyzer 24 and the GUI 26 at the server 22.

At block 90, processed log data is obtained. This may include receiving processed log data from a log processor via the network 14.

At block 92, a graph, such as an S3 graph, is constructed by identifying how each object type is related to the other object types with respect to participating in the same event.

At block 94, specific object instances that are involved in each event may be identified to identify execution structure and hierarchy between objects. The graph may be updated or a new graph may be built. Such a graph may be referred to as an S3i or $S_i^3$ graph.

At block 96, the result of blocks 90-94, such as the S3i graph, is stored in a database.

At block 98, the result is outputted at a GUI. This may include displaying objects along a timeline and displaying a hierarchy of objects in play when servicing requests.

The above process may be implemented as a daemon process, whose example implementation is described below. Two threads may be used. A first thread may match a stream of incoming events against the graph (S3) to generate an instantiated graph (S3i). Each node in the instantiated graph is an object instance, whose signature is a set of identifier values instead of types as in the non-instantiated or S3 graph. The set of events that include the object instance is also recorded for each node of the graph.

For each event, e, the event instantiates a node, N, from the S3 graph if the set of identifier types in the event e is a superset of those in the node N's signature. For example, both events {app_14} and {app_14, attempt14_m_0} instantiate node {APP}. Initially, when no object instances have been created, for each incoming event, whether the event instantiates any of the root nodes in the S3 graph is checked. If so, an object instance node is created in the S3i graph. For example, event {user1} will cause the creation of a node in the S3i graph, with signature {user1}.

Once an object instance node has been created in the S3i graph, each incoming event for a match against any of the existing S3i nodes. An event, e, matches a node, n, in the S3i graph if event e's identifier set is a superset of node n's signature. If so, event e is added to the event set of node n. For each node, n, that event e matches, it is determined whether event e can instantiate any of the children of node, N, in the S3 graph (where n is instantiated from N). If so, the children of node N are further instantiated and added as children of node n. If one event matches multiple S3i nodes that are not on the same path, a link is created between each node pair, indicating an interaction between them. Links may be represented by vertical lines, for example, in the GUI 26.

FIG. 7 and FIG. 8 show example graphs based on example log messages shown in FIG. 9. An example S3 graph for a Hive example shown in FIG. 7. FIG. 8 shows an example instantiated S3i graph that may be generated after analyzing several log messages. Each node is an object instance. The events that include the object are also shown on each node. In the example shown, the first message instantiates the node "user1". The second message matches the first node, instantiates a child node "query_14", and then further instantiates node "app_14" as a child of node "query_14". The third message matches node "app_14", but does not instantiate any new nodes. The fourth and fifth messages match node "app_14" and then instantiate two nodes with signatures "attempt14_m_0" and "attempt14_m_5" respectively.

A second thread of the example daemon builds the S3 graph, and incrementally updates it based on new patterns observed from incoming events. The thread first updates a type relation graph incrementally based on the observation that the relationship between two object types can only be updated in one direction, i.e., 1:1→*1:n→*m:n. Once the type relation graph is up to date, the process rebuilds the S3 graph and notifies the first thread so that it may use the latest S3 graph to the build S3i graph.

A process for building, rebuilding, and/or updating an S3 graph and a type relation graph will now be described.

Information may be extracted from logs to identify objects, their interactions, and their hierarchical relationships. An S3 graph, which may a directed acyclic graph (DAG), may be generated such that each node represents an object type and each directed edge captures a hierarchical relationship between a high-level object type (parent) and a low-level object type (child).

Each logged event e may be treated as a set of identifiers, $id_{e1} \ldots id_{en}$. Object identifiers may be extracted by disregarding static substrings and applying a number of heuristics. For example, variables preceded by common non-identifier types (e.g., "size") or succeeded by units (e.g., "ms") may be disregarded. Example identifiers extracted in this way include machine IP addresses, process IDs, thread IDs, and file names. Note that the extracted IDs are often ambiguous until they obtain a context within which they can be interpreted. For instance, a process ID is unambiguous only if interpreted within the context of a specific host.

Each identifier is of a type, which may be the type of the object it represents (e.g., a process, a thread, an IP address, a host name). In the following, identifiers are represented in lowercase and their types in uppercase. For example, both host1 and host2 are of type HOST. Type may be identified by applying a number of heuristics that identify, for example, common static strings surrounding identifiers, common static substrings within identifiers, or the structure of the identifiers. The actual type (e.g., IP address, pid, file name, etc.) need not be understood or identified by the process, which may simply differentiate between types abstractly (e.g., TYPEA, TYPEB, TYPEC, etc.).

Two objects, $obj_i$ and $obj_j$, are determined to be correlated, represented as $obj_i \sim obj_j$, if both objects were participants in the same logged event, meaning both of their IDs appeared in the same log message.

A first object $obj_i$ subsumes a second object $obj_j$, or $obj_i \vdash obj_j$, if and only if: (1) the objects are correlated, and (2) the second $obj_j$ is not correlated with any other object of the same type as the first object $obj_i$. For example, in Hive, a user $u_i$ subsumes query $q_k$ because the user $u_i$ will submit many different queries (including $q_k$), yet two queries with the same name will not typically be submitted by different users since each query is assigned a globally unique ID based on its timestamp and global order.

For a number of object types identified, $T_1 \ldots T_t$, the relationship between each possible pair $(T_I, T_{J\neq I})$ may be categorized as one of (i) empty, (ii) 1:1, (iii) 1:n, or (iv) m:n. This categorization may be used to help identify objects unambiguously and to identify the system stack object structure. The relationship is empty if object IDs of the two types never appear in the same log message. The relationship is 1:1, i.e., $T_i \equiv T_J$, if it is not empty, and $\forall\ obj_i \in T_I$, $\forall\ obj_j \in T_J$, $obj_i \sim obj_j \Rightarrow (obj_i \vdash obj_j) \wedge (obj_j \vdash obj_i)$. For example, IP_ADDR≡HOST if there is no IP remapping. It is 1:n, i.e., $T_I \rightarrow T_J$, if it is not empty or 1:1, and $\forall\ obj_i \in T_I$, $\forall\ obj_j \in T_{J,obji} \sim obj_j \Rightarrow obj_i \vdash obj_j$. Finally, the relationship is m:n, i.e., $T_I \bowtie T_J$, if and only if $\exists obj_i \in T_I$, $\exists obj_j \in T_J$, s.t. $obj_i \sim obj_j$ while $obj_i \nvdash obj_j$ and $obj_j \nvdash obj_i$.

The larger the size of the logs being used for the analysis, the better the relationships may be categorized. If the size is too small, then some of the type relationships might be miscategorized. For example, (USER, QUERY) will be categorized as 1:1 instead of 1:n if the log spans the processing of only one query. Logs spanning too large a time frame may also cause miscategorizations. For example, (USER, QUERY) might be categorized as m:n if the query ID wraps around. However, mature distributed systems like Hadoop, Spark, and OpenStack use universally unique identifier (UUID) libraries to assign key identifiers. Therefore, the likelihood of identifier reuse is low.

Conclusions may be drawn about a pair of identifiers based on the relationship between their types. For example, two identifiers with types in a 1:1 relationship may indicate that one might be able to use the two identifiers to identify an object interchangeably. Two identifiers with types in an m:n relationship may suggest that their combination is required to unambiguously identify an object. Two correlated objects with IDs of types in a 1:n relationship may indicate a hierarchical relationship between the objects they represent. For example, one may have created or forked the other.

To illustrate how the relationship between object types may be useful, an example log snipped is shown in FIG. 9, which is the slightly simplified log output when processing two Hive queries. The software component that output each log message is shown at the beginning of the line. RM and AM stand for YARN's Resource Manager and Application Manager, respectively. MR stands for MapReduce. Examples of identifiers of objects of different types are indicated at 120, 122, 124, 126, 128, 130, and 132.

In FIG. 9, messages 2-25 are outputted when processing query_14 submitted by Hive. YARN assigns it to an application (app_14), which in turn spawns two map and two reduce task attempts. Each attempt is dispatched and executed in a container. After the map phase, each reduce attempt creates two fetchers. Each fetcher is a thread that shuffles output from map attempts. Messages 27-33 show events related to query_15 where map and reduce attempts fail and get reassigned to different containers. It also shows that the same container can be reused by multiple attempts.

FIG. 10 shows relationships between each pair of object types. This may be termed a type relation graph. Each node is an object type. A solid arrow represents a 1:n relationship between the source and the destination object types and a dotted line represents an m:n relationship. There is no 1:1 relationship between types in the Hive log example.

As shown in FIG. 10, while a user can submit multiple queries, a query is always uniquely associated with a single user. Hence, USER to QUERY is a 1:n relationship. Further, the application ID (e.g., the "14" in "app_14") is included as part of both the identifiers of the MapReduce attempts and the containers spawned by this application. Hence APP→ATTEMPT_M, APP→ATTEMPT_R, and APP→CONTAINER. Map attempts may be parsed as being of a different type than reduce attempts because they have different "schemas" (e.g., "attempt(.*)_m_(.*)" versus "attempt(.*)_r_(.*)"). ATTEMPT_R has an m:n relationship with CONTAINER because a container can be reused by multiple attempts while an attempt can also be assigned to multiple containers, given container failures.

The object identification process illustrated in FIG. 11 shows how objects may be further identified unambiguously given that some of the identifiers used to refer to objects are ambiguous. This process takes two inputs: the type relation graph and the entire set of EVENTS (type). Each event type, E, is represented as a set of object types based on the IDs found in the event log message. For example, E might be {USER, QUERY, APP}, as extracted from line 2 in FIG. 9. The process converts the type relation graph into an S3 graph in a sequence of steps. Each node in the graph represents an object type along with its signature. This signature is the set of object identifier types defined by the requirement that an ID of each type must be present in order to unambiguously identify the object.

The process is started by setting the signature of every node in the type relation graph to the type of the object. The algorithm then goes through the following steps:

In Step "1", 1:1 nodes are merged. First, merging the nodes that are connected with ≡ edges is attempted. If two types have a 1:1 relationship, then the IDs of those types may often be used interchangeably to represent the same object. However, this is not always true. For example, YARN creates a unique uniform resource locator (url) for each reduce task attempt so that a user can monitor the progress of this attempt in a web browser. Consequently, ATTEMPT_R≡URL may be inferred. However, URL is a generic type, and there can be other urls that are not related to any reduce attempt. For example, every job has its configuration information stored in an Extensible Markup Language (XML) file that is referenced by a url. This XML file url does not appear together with any reduce attempt in any event. Therefore, is cannot be determined that URL and ATTEMPT_R may be used interchangeably. Note that ATTEMPT_R≡URL may be inferred because for every pair of reduce attempt ($att_i$) and url ($url_j$) such that $att_i$~$url_j$, $att_i$⊢$url_j$ and $url_j$⊢$att_i$.

Instead, only those nodes $T_1, T_2, \ldots T_n$ in a≡connected component whose types can indeed be used interchangeably (line 3) are merged. For example, when for any $obj_i$ of type $T_1$, there exists $obj_1$ of type $T_1$, $obj_2$ of type $T_2$, ..., $obj_n$ of type $T_n$ such that $obj_1 \equiv obj_2 \ldots \equiv obj_n$, where $obj_i \equiv obj_j$ iff $obj_i$~$obj_j$/\$obj_i$⊢$obj_j$/\$obj_j$⊢$obj_i$. This prevents ATTEMPT_R and URL from being merged because there exist urls, such as the XML file url, that are not correlated with any reduce attempt. The fact that the types of the merged nodes can be used interchangeably indicates they are redundant. To merge $\{T_1, \ldots T_n\}$, their signatures may be hashed into a single value representing a new "type", and every $T_i$ in EVENTS are replaced with this hash value. After this, the outstanding≡edges, such as ATTEMPT_R≡URL, are removed as the types that are connected by them are not truly interchangeable.

In Step "2" m:n nodes are processed. In order to be able to identify objects unambiguously, types with m:n relationships may be combined. It is thus to be determined which types should be combined. For example, "HOST", "PID", and "TID" (i.e., a thread ID type) have an m:n relationship between each pair. While {HOST}, {HOST,PID}, and {HOST,PID,TID} are meaningful combinations as they unambiguously identify hosts, processes, and threads respectively, the combination of {HOST,TID} is meaningless. To eliminate meaningless combinations, all of the different combinations the programmers outputted in the log statements are considered and only the type combinations that appear in at least one log message are included. The reasoning is as follows: if a combination of identifiers is necessary to represent an object unambiguously, then a programmer will tend to always output them together. A meaningless combination, such as {HOST,TID}, will likely never be found alone in a log message without a process ID type, "PID", so combinations such as these are discarded.

Therefore, for each N-connected component, C, only the type subsets where there exists an E ∈ EVENTS represented by a log message that contains exactly the types in this subset may be considered, but not any type in its complement set (lines 11-25). A node whose type always appears with other types in the same C is removed at the end (line 24).

For the example type relation graph shown in FIG. 10, Step "2" creates four new nodes: {CONTAINER, FETCHER}, {CONTAINER, FETCHER, ATTEMPT_M}, {CONTAINER, ATTEMPT_R}, and {CONTAINER, ATTEMPT_M}. After creating the nodes, 1:n edges may be added from less constrained object types to more constrained object types (lines 17-19). For example, a→edge will be added from node {CONTAINER} to {CONTAINER, FETCHER}.

In Step "3", non-objects are filtered. It should be noted that not every node created in the previous step is an actual object type in the system. Among the nodes that are created in Step "2" for the Hive example, only the one whose signature is {CONTAINER, FETCHER} represents a true object type, namely a fetcher thread in a container process. To filter out non-object types, nodes that are a combination of two existing object types may be removed. Hence, in the present example, {CONTAINER, FETCHER, ATTEMPT_M}, {CONTAINER, ATTEMPT_R}, and {CONTAINER, ATTEMPT_M} would be removed because they are combinations of other object types.

FIG. 7 shows an example S3 graph constructed from the example Hive log shown in FIG. 9. This graph provides a simple model of the system. Each node is a type of object, and each edge represents a 1:n relationship, which indicates a hierarchical relationship, such as fork or creation. Note that the S3 Graph should be cycle free, because objects do not generally have a circular fork or creation pattern. If a cycle exists, then it must already have existed in the Type Relation graph since the process illustrated in FIG. 11 does not introduce any cycles. Therefore, a cycle detection process may be first run on the type relation graph. If a cycle is detected, every 1:n edge in the cycle is conservatively changed to an m:n edge.

Figure 12:
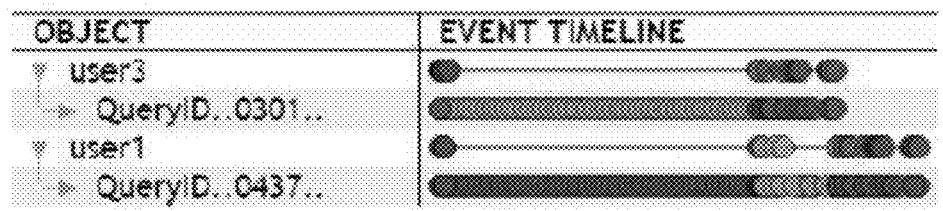
FIG. 12 is a diagram of an example event timeline at a user interface.

An example GUI 26 is shown in FIG. 12. Objects are organized hierarchically allowing users to understand the system's structure as they drill down on each object. Each line represents an object with its IDs listed in the left panel. Users can drill down to objects at the next level by selecting (e.g., clicking) on the object. Each circle in the right panel represents an individual event, and its shading indicates the host 12 where the corresponding log message was outputted. Only two queries are shown for sake of brevity. The event timeline shows the events where the object ID appeared such that the first and last event can be used to infer the object's lifetime. Thus, a user can immediately determine that Query "0437" has the longest execution time and drill down to investigate.

Figure 13:
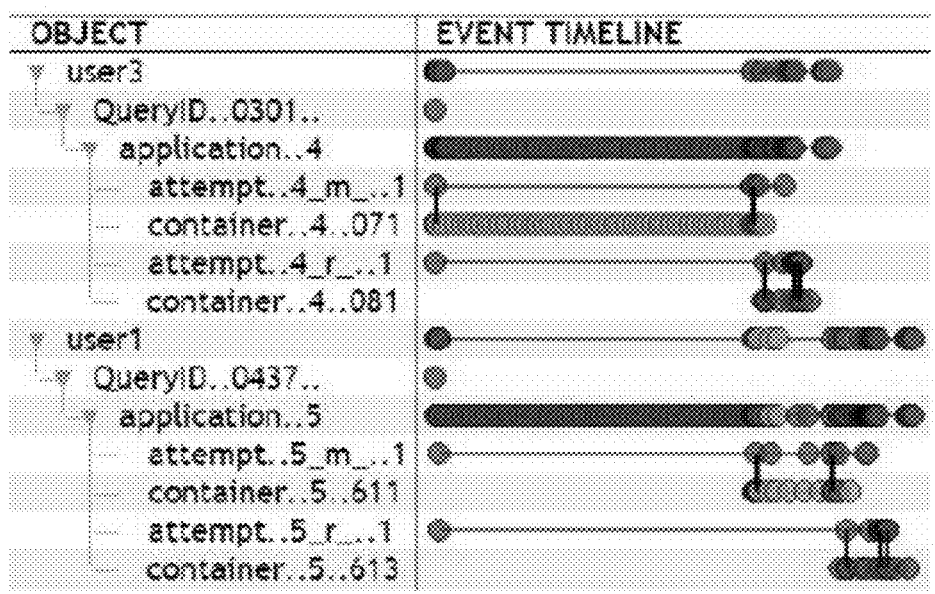
FIG. 13 is a diagram of an example expanded representation of the event timeline of FIG. 12.

FIG. 13 shows the GUI 26 following the expansion of both queries down to the level of map/reduce tasks. Under each query is the YARN application created to process it, and under each application are the map/reduce task attempts and containers spawned to process the request. Clearly visible is that user1's jobs start processing as soon as user3 releases its containers. The vertical lines show the interactions among objects, which are inferred from the events that included multiple objects. It shows that user1's Query 0437 has attempts that were created early on but only received containers much later. This allocation may correspond with the release of a container in user3's Query 0301, suggesting allocation was being serialized across users. This serialization may be caused by a bug in YARN's Capacity Scheduler which may incorrectly limited all users' resource usage whenever a single user reached his or her limit.

The GUI 26 may load the S3i graph as a JSON file and displays each node and its events as a row in a two-panel layout as shown in FIGS. 12 and 13. The graph may be rendered using an HTML5 Canvas and drawing hidden elements may be avoided where possible. For each node the user drills down, a transitive reduction on the edges between this node and its children may be performed.

With the extracted hierarchy information, the GUI 26 may initially show only the highest-level objects. The user can selectively drill down incrementally by selecting any of the objects of interest to expose more details at a lower-level. This enables identification of performance bottlenecks and analysis of potential root causes. A controlled user study showed that developers were able to speed up an analysis and debugging process by a factor of 4.6 compared to when they were restricted to using raw logs only. A system model was able to be reconstructed from logs with 96% accuracy when applied to Hive stack, Spark stack, and Open-Stack logs produced by 200 hosts as well as logs from production server stacks.

FIG. 14 shows test results for the techniques described herein applied to identify objects across the four different system stacks: Hive stack, Spark stack, Open-Stack, and the production server stack. For each workload, a complete set of logs was analyzed without performing sampling. The total number of instances without performing sampling. The total number of instances included 14.8 million log messages, from which 5.4 million identifier values were extracted to then infer 700,000 objects and 3.1 million edges. FIG. 14 shows a reduced complexity achieved by extracting the underlying system model. There are only 413 log event types, 160 identifier types, 101 object types, and 193 edges.

Figure 15:
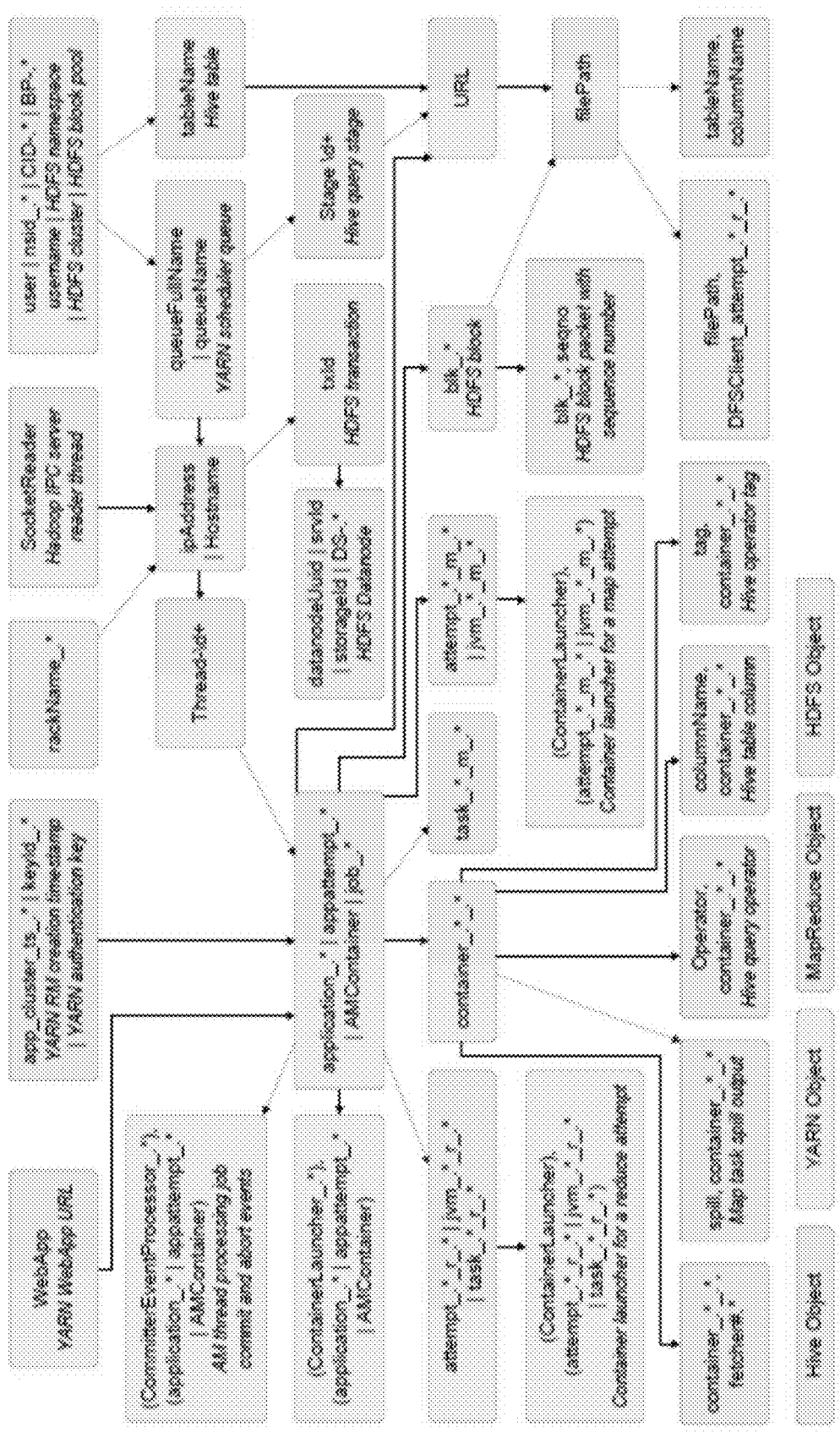
FIG. 15 is a graph constructed from test logs.

FIG. 15 shows an entire, unfiltered S3 graph inferred from the 4 million messages produced by the Hive stack. It clearly shows the hierarchical structure of the system.

The techniques described herein are able to construct a system model of an entire software stack without needing any built-in domain knowledge. An end-to-end execution flow of requests being serviced by distributed server stacks may be reconstructed in a non-intrusive manner. Analysis of unstructured log output from heterogeneous software components may be performed and a system model which captures the objects involved, their lifetimes, and their hierarchical relationships may be constructed. Diagnosis of complex cross-component failures may be performed non-intrusively. The techniques described herein focus on objects and their relationships and interactions as a way to account for system complexity, as opposed to focusing on events. Complexity is managed, for example, by initially displaying only high-level objects until a user decides to drill down on target objects.

It should be recognized that features and aspects of the various examples provided above can be combined into further examples that also fall within the scope of the present disclosure. In addition, the figures are not to scale and may have size and shape exaggerated for illustrative purposes.

What is claimed is:

1. A process comprising:
   obtaining a log of execution of an executable program;
   parsing log messages contained in the log without prior knowledge of a structure of the log messages, wherein parsing a particular log message involves parsing the particular log message into an object identifier and one or more of a string constant and a non-identifier, the object identifier being one or more segments of the particular log message not parsed as a string constant or a non-identifier, the object identifier representative of one or more instances of programmatic elements in the executable program;
   identifying relationships among object identifiers of parsed log messages by inferring object types of objects represented by the object identifiers and identifying relationships among the object types of objects to obtain identified relationships, wherein an object type of the object identifier in the particular log message is inferred from a schema of the object identifier and the one or more of a string constant and a non-identifier in the particular log message;
   constructing a representation of the identified relationships; and
   outputting the representation, wherein the representation comprises a set of event timelines, each event timeline corresponding to an object, each event timeline depicting one or more nodes which each represent an event identified in a log message which contains the corresponding object, and wherein the event timelines are organized in nested hierarchical relationships corresponding to identified relationships of the corresponding object.

2. The process of claim 1, wherein the object types are empirical types that are not constrained to correspond to object types defined by a programming language of the executable program.

3. The process of claim 1, further comprising determining events from log messages and including the events in the representation.

4. The process of claim 1, wherein the log messages are generated by log statements provided to the executable program by a human programmer.

5. The process of claim 1, further comprising identifying relationship types of the identified relationships, and wherein the representation comprises indications of the relationship types of the identified relationships.

6. The process of claim 1, wherein the representation includes a visual connection between a node of a first event timeline and a node of a second event timeline, the connection indicating an event that contains object identifiers corresponding to the objects of the first and second event timelines.

7. A non-transitory machine-readable storage medium comprising instructions that, when executed by a processor:

discover a log of execution of an executable program;
extract a string constant from the executable program;
use the string constant to parse an unstructured log message contained in the log to generate an object identifier representative of an instance of a programmatic element in the executable program, wherein generating the object identifier involves identifying a segment of the unstructured log message that does not match the string constant or another non-identifier;
identify a relationship between the object identifier and another object identifier to obtain an identified relationship for output in a representation, wherein identifying the relationship involves inferring an object type of the object identifier from a schema of the object identifier and the string constant or another non-identifier in the unstructured log message,
construct a representation of the identified relationships; and
output the representation, wherein the representation comprises a set of event timelines, each event timeline corresponding to an object, each event timeline depicting one or more nodes which each represent an event identified in a log message which contains the corresponding object, and wherein the event timelines are organized in nested hierarchical relationships corresponding to identified relationships of the corresponding object.

8. The storage medium of claim 7, wherein the instructions are further to locate the executable program in a file system of a host.

9. The storage medium of claim 7, wherein the object type is an empirical type that is not constrained to correspond to object types defined by a programming language of the executable program.

10. The storage medium of claim 7, wherein the instructions are further to transmit an indication of the identified relationship to a server via a network.

11. The storage medium of claim 7, wherein the unstructured log message is generated by a log statement provided to the executable program by a human programmer.

12. The storage medium of claim 7, wherein the instructions are further to identify relationship types of the identified relationships, and wherein the representation comprises indications of the relationship types of the identified relationships.

13. The storage medium of claim 7, wherein the representation includes a visual connection between a node of a first event timeline and a node of a second event timeline, the connection indicating an event that contains object identifiers corresponding to the objects of the first and second event timelines.

14. A non-transitory machine-readable storage medium comprising instructions that, when executed by a processor:
extract string constants from an executable program;
obtain log data that includes identified relationships among object identifiers representative of instances of programmatic elements in the executable program;
construct a representation of the identified relationships; and
output the representation, wherein the log data is based on unstructured log messages generated by log statements provided to the executable program and parsed using the string constants to generate the object identifiers, wherein generating the object identifiers involves identifying segments of the unstructured log messages that do not match the string constants or other non-identifiers in the unstructured log messages, and wherein the identified relationships are identified by inferring the object types of the object identifiers from schemas of the object identifiers, string constants, and other non-identifiers in the unstructured log messages;
wherein the representation comprises a set of event timelines, each event timeline corresponding to an object, each event timeline depicting one or more nodes which each represent an event identified in a log message which contains the corresponding object, and wherein the event timelines are organized in nested hierarchical relationships corresponding to identified relationships of the corresponding object.

15. The storage medium of claim 14, wherein the instructions are further to identify relationship types of the identified relationships, and wherein the representation comprises indications of the relationship types of the identified relationships.

16. The storage medium of claim 14, wherein the representation includes a visual connection between a node of a first event timeline and a node of a second event timeline, the connection indicating an event that contains object identifiers corresponding to the objects of the first and second event timelines.

* * * * *